United States Patent [19]

Huber et al.

[11] 4,394,518

[45] Jul. 19, 1983

[54] ORGANIC FIBERS HAVING IMPROVED SLIP PROPERTIES

[75] Inventors: Peter Huber; Peter August; Helga Lampelzammer, all of Burghausen; Willi Primas, Simbach, all of Fed. Rep. of Germany

[73] Assignee: Wacker-Chemie GmbH, Munich, Fed. Rep. of Germany

[21] Appl. No.: 108,895

[22] Filed: Dec. 31, 1979

Related U.S. Application Data

[63] Continuation of Ser. No. 876,454, Feb. 9, 1978, abandoned.

[51] Int. Cl.³ ............................................. C07F 7/10
[52] U.S. Cl. .................................... 556/424; 556/425; 556/436; 556/440; 556/413; 556/428
[58] Field of Search ............................... 556/425, 424

[56] References Cited

U.S. PATENT DOCUMENTS 3,890,269  6/1975  Martin ............................ 556/425 X
4,139,547  2/1979  Berger ........................... 556/413 UX
4,152,346  5/1979  Seiler et al. ...................... 556/425 X

*Primary Examiner*—Paul F. Shaver

[57] ABSTRACT

This invention relates to polymeric organosilicon compounds containing aryl radicals and to a method for improving the gliding or slipping properties of organic fibers treated therewith. The polymeric organosilicon compounds are represented by the formula $$M_aR_bSi\{[(OSiR_2)_nD]_m(OSiR_2)_nOSiR_{3-d}M_d\}_{4-a-b}$$

in which R is hydrocarbon or substituted hydrocarbon radical, D represents radicals of the formula $$-X_aA-X_a(A-X_a)_c-,$$

X represents the groups:

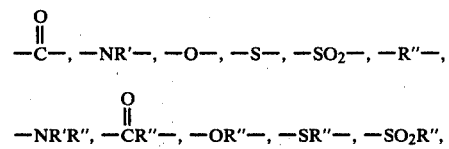

where R' is hydrogen or R, R" is a bivalent aliphatic hydrocarbon radical, A is a bivalent or substituted bivalent aromatic hydrocarbon radical, M represents radicals of the formula $$-X_a-A-X_a(A-X_a)_cH,$$

a is 0 or 1, b is 0, 1 or 2, c is 0 or a number of from 1 to 5, d is 0 or 1, m is 0 or a number of from 1 to 20, n is a number of from 1 to 1,000 with the proviso that at least one OSiR₂— unit and at least one $X_a$—A—$X_a$—A group must be present for each molecule.

2 Claims, No Drawings

ORGANIC FIBERS HAVING IMPROVED SLIP PROPERTIES

This is a continuation of application Ser. No. 876,454, filed Feb. 9, 1978, now abandoned.

The present invention relates to organic fibers having improved slip properties and more particularly to a process for treating organic fibers with a polymeric organosilicon compound having aryl radicals to impart improved slipping or gliding properties thereto.

BACKGROUND OF THE INVENTION

Organic fibers have been treated with a block copolymer containing "Bisphenol-A-polycarbonate segments" and polydimethylsiloxane segments in accordance with the process described in German Patent Application No. 2,162,417 to impart improved gliding properties thereto. However, it has been found that the process of this invention imparts substantially better glide properties to organic fibers than was possible to achieve with the processes known heretofore.

Therefore, it is an object of the present invention to provide organic fibers having improved slip properties. Still another object of this invention is to provide polymeric organosilicon compounds containing aryl radicals which will impart improved lubricity to organic fibers treated therewith. A further object of this invention is to provide a process for treating organic fibers with polymeric organosilicon compounds containing aryl radicals to impart improved lubricity thereto.

SUMMARY OF THE INVENTION

The foregoing objects and others which will become apparent from the following description are accomplished, generally speaking, by applying to organic fibers are aryl containing polymeric organosilicon compound having the general formula $$M_aR_bSi\{[(OSiR_2)_nD]_m(OSiR_2)_nOSiR_{3-d}M_d\}_{4-a-b}$$

where R is the same or different and represents monovalent hydrocarbon radicals or substituted hydrocarbon radicals having from 1 to 10 carbon atoms, D represents the same or different radicals having formula:

$$-X_aA-X_a(A-X_a)_c-,$$

X represents the same or different members of the following group:

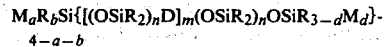

R' represents hydrogen or R, R" represents a bivalent aliphatic hydrocarbon radical having from 1 to 8 carbon atoms, A represents the same or different bivalent aromatic or substituted bivalent aromatic hydrocarbon radicals, M represents the same or different radicals of the formula

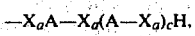

where X and A are the same as above, a is 0 to 1, b is 0, 1, or 2, c is 0 or a number having a value of from 1 to 5, d is 0 or 1, m is 0 or a number having a value of from 1 to 20, n represents a number having a value of from 1 to 1,000, with the proviso that, at least one OSiR$_2$—unit and at least one —X$_a$A—X$_a$ A group must be present for each molecule.

DETAILED DESCRIPTION OF THE INVENTION

Other aryl containing polymeric organosilicon compounds which are included in the above general formula are those represented by the formulas $$R_aSi\{[(OSiR_2)_nD]_m(OSiR_2)_nM\}_{4-a}$$

$$R_aSi\{[(SiR_2)_nD]_mOSiR_3\}_{4-a}$$

$$MR_2Si[(OSiR_2)_nD]_m(OSiR_2)_nM$$

$$R_3Si[(OSiR_2)_nD]_mOSiR_3.$$

It is preferred that the M$_a$R$_b$Si units in which the sum of a+b is 0 or 1, be less than about 20 mol percent and more preferably less than about 10 mol percent of the siloxane units in the organosilicon compounds represented in the above formulas.

Because of their availability, it is preferred that at least 50 percent of the SiC bonded R radicals be methyl radicals. Examples of other hydrocarbon radicals represented by R are alkyl radicals, such as the ethyl, n-propyl, isopropyl, n-butyl, sec-butyl, n-pentyl and sec-pentyl radicals; and aryl radicals such as the phenyl radical. Examples of substituted hydrocarbon radicals represented by R are particularly halogenated hydrocarbon radicals such as the 3,3,3-trifluoropropyl radical and o, p and m-chlorophenyl radicals, as well as hydrocarbon radicals which have been substituted by at least one amino group, for example the N-beta-aminoethyl-gamma-aminopropyl radical.

When the A radicals are bivalent substituted aromatic hydrocarbon radicals, then the substituted groups can be halogen atoms such as chlorine atoms, alkyl radicals such as the tert-octyl radical, alkaryl radicals such as the tolyl radical, alkenyl radicals such as the vinyl radical, hydroxyl groups, hydrocarbonoxy groups and/or amino groups.

The preferred examples of alkyl radicals represented by R"", which may be straight-chain, branched or cyclic, are the methylene and the isopropylene radicals.

Examples of radicals represented by D are those corresponding to the following formulas:

—C$_6$H$_{4-p}$
R"'$_p$—, —p—(CH$_2$)$_2$
C$_6$H$_{4-p}$R"'$_p$
—(CH$_2$)$_2$—,
—o-(CH$_2$)$_2$C$_6$H$_{4-p}$
R"'$_p$(CH$_2$)$_2$—, —
m—(CH$_2$)$_2$C$_6$H$_{4-p}$
R"'(CH$_2$)$_2$—, —
o—OC$_6$H$_{4-p}$R"'$_p$
C(CH$_3$)$_2$C$_6$H$_{4-p}$
R"'$_p$O—,o—(CH$_2$)$_3$
OC$_6$H$_{4-p}$R"'$_p$—C(CH$_3$)$_2$
C$_6$H$_{4-p}$R"'$_p$
O(CH$_2$)$_3$— and o—OC$_6$H$_4$OC$_6$H$_4$O—.

In the above formulas R"' represents the methyl, methoxy, tert-butyl, tert-butoxy radicals or the tert-octyl radical, and p is 1, 2, 3 or 4.

Examples of radicals represented by M are those having the formula:

—C₆H₅₋$_{p'}$R'''$_{p'}$—OC₆H₅₋$_{p'}$R'''$_{p'}$, —(CH₂)₃—O—C₆H₅₋$_{p'}$R'''$_{p'}$, —(CH₂)₂—C₆H₅₋$_{p'}$R''' and —OC₆H₄₋$_{p}$R'''C(CH₃)₂C₆H₄₋$_{p}$R'''OH, where R''' and p are the same as above and p' is 1, 2, 3, 4 or 5.

In accordance with this invention, it is preferred that the radicals represented by D and/or M in the organosilicon compounds be derived from monovalent and/or polyvalent phenols or bisphenols.

The compounds having the following general formula:

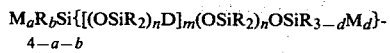
4−a−b may be prepared in accordance with the processes described for example in British Pat. No. 1,064,021 or German Patent Application No. P 25 38 818.5.

The organosilicon compounds of this invention can be applied in admixture with other substances which have heretofore been used to improve the slipping or gliding properties of organic fibers. Examples of such other substances which can be employed together with the compounds of this invention are paraffin and/or polyethylene waxes, antistatic agents, such as lauryl phosphoric acid partial esters and/or diorganopolysiloxanes, including those obtained by emulsion polymerization which have been used heretofore to improve the slipping or gliding properties of organic fibers. It is preferred that the diorganopolysiloxanes which are used as lubricants for organic fibers have a viscosity of from 500 to 100,000 cP at 25° C. The distribution of the molecular weight of these diorganopolysiloxanes can be anywhere within the above range.

When diorganopolysiloxanes are employed as lubricants for organic fibers, they are preferably used in amounts of from 1 to 99 percent by weight based on the total weight of the silicon compounds.

When the organosilicon compounds of this invention are used either alone or in combination with other substances, they may be applied in concentrated form or in the form of dispersions in water or in organic solvents or in the form of solutions in organic solvents, such as di-n-butylether, aromatic hydrocarbons and/or chlorinated hydrocarbons.

The organosilicon compounds of this invention and if desired other substances may be applied to all organic fibers on which diorganopolysiloxanes based lubricants have been or could have been applied. Examples of such fibers are wool, cotton, rayon, hemp, natural silk, polypropylene, polyethylene, polyester, polyurethane, polyamide, cellulose acetate and polyacrylonitrile fibers and mixtures of such fibers. The fibers may consist of staple fibers or monofilaments. It is preferred that the compositions be applied to sewing thread.

The organosilicon compounds employed in accordance with this invention and if desired other substances which may be employed, can be applied to the fibers by any means known in the art, such as by spraying, immersion, coating, calendering or by gliding the fibers across a base which has been saturated with the organosilicon compounds of this invention and other substances, if desired.

The organosilicon compounds which are employed in accordance with this invention are prepared in the following manner:

(A) About 400 gm of a hydroxyl-terminated dimethylpolysiloxane having a viscosity of 140 cSt at 25° C., 0.7 gm of a trimethylsiloxy end-blocked dimethylpolysiloxane having a viscosity of 1,000 cSt at 25° C., and 0.05 ml of a 25 percent by weight solution of Cl₃PNPCl₂NPCl₃.PCl₆ in methylene chloride are kneaded in a laboratory kneader for 30 minutes while being heated to 80° C. The temperature is then increased to 120° C. and 20 gm of a mixture containing 8 percent by weight of tert-octylphenol, 2 parts by weight of 2,2-bis-(4-hydroxyphenyl)-propane and 0.1 ml of the above described phosphoronitrile chloride solution is added. Kneading is then continued for 30 minutes at 120° C. and approximately 760 mm (Hg (abs.) and finally for 30 minutes at 120° C. and approximately 1 mm Hg (abs.). Subsequently, 0.3 ml of tert-octylamine is added and kneading is continued for 1 additional hour at 120° C. under a pressure of approximately 1 mm Hg. Unreacted phenyl residues are then removed with a film evaporator. The product obtained is colorless, slightly opaque and has a viscosity of 655 cSt at 25° C., $n_{25}^D$ 1.4081.

(B) About 16.68 gm (0.06 mol) of 2,2-bis-(4-hydroxyphenyl)-propane which has been dried over phosphorus pentachloride and 10 ml of triethylamine which has been dried over potassium hydroxide are added to 200 ml of anhydrous toluene in a 1-liter three-necked flask which is equipped with an addition funnel, a stirrer and a reflux condenser. At a temperature of about 60° C. and with constant agitation, 222 gm (0.03 mol) of

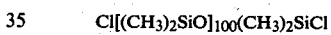

are added dropwise over a period of 30 minutes to the resultant solution. Thereafter the mixture is heated to reflux temperature and refluxed for one hour. The mixture is then allowed to stand overnight, filtered at room temperature and the volatile components are removed from the filtrate with the aid of a rotating evaporator. A milky-opaque liquid, having a viscosity of 9,100 cSt at 25° C. is recovered.

(C) About 8.34 gm (0.036 mol) of 2,2-bis-(4-hydroxyphenyl)-propane which has been dried over phosphorus pentachloride and 5 ml of triethylamine which has been dried over potassium hydroxide are dissolved in 200 ml of anhydrous toluene in a 1-liter three-necked flask which is equipped with an addition funnel, stirrer and reflux condenser. At a temperature of about 60° C. and under constant agitation, 222 gm (0.03 mol) of Cl[(CH₃)₂SiO]₁₀₀(CH₃)₂—SiCl are added dropwise over a period of 30 minutes to the resultant solution. After the product has been allowed to stand overnight at room temperature, it is filtered and the volatile components are removed from the filtrate by means of a rotating evaporator. A milky-opaque liquid having a viscosity of 10,330 cSt at 25° C. is recovered.

EXAMPLES 1 THROUGH 4 AND COMPARISON EXAMPLES

The lubricants indicated in the following table are applied each time to 500 meters of black thread consisting of triple twisted polyester staple fiber. One hundred meters of the untwisted yarn weighs one gram. The thread used is marketed by the Gutermann Company under the trade name "Mara". The lubricants are applied by conducting the thread over a drum which rotates in a tub filled with the lubricant, before the thread is wound on spools by means of a spooling machine marketed by the Sahm Company of Eschwege, German Federal Republic under the name "Pramat-junior K".

The treated thread is used to sew four layers of polyacrylonitrile awning fabric, using an industrial sewing machine (type "438", Pfaff Company) at the rate of 7,000 stitches per minute (straight seam, distance between stitches: 2.5 mm) with the simultaneous use of a thread tension device (manufacturer: Schmidt Company, Waldkraiburg). As a means for measuring the increased gliding properties achieved by means of the tested lubricants, the following Table illustrates the thread tension of the various compositions.

cals having from 1 to 10 carbon atoms, D is a radical of the formula $$-X_a A-X_a-(A-X_a)_c-,$$

where X is selected from the group consisting of $$-NR'- \text{ and } -NR'R''$$

where R' is hydrogen or R, R" is a bivalent aliphatic hydrocarbon radical, A is selected from the group consisting of a bivalent aromatic hydrocarbon radical and a substituted bivalent aromatic hydrocarbon radical, M is a radical of the formula $$-X_a-A-X_a-(A-X_a)_cH,$$

TABLE

| | Examples | | | | Comparison Examples | |
|---|---|---|---|---|---|---|
| | 1 | 2 | 3 | 4 | V$_1$ | V$_2$ |
| Organosilicon Compound (I) | A | B | C | B | — | Siloxane-carbonate-block copolymer |
| Parts of (I) | 100 | 100 | 29 | 40 | — | 29 |
| Additional Materials (II) | — | — | Dimethyl-polysiloxane+ | Paraffin Wax++ | Dimethyl-polysiloxane+ | Dimethyl-polysiloxane+ |
| Parts of (II) | — | — | 165 | 10 | 100 | 165 |
| Diluent | — | Trichloro-ethylene | Trichloro-ethylene | H$_2$O$^4$ | Trichloro-ethylene | Trichloro-ethylene |
| Concentration of I + II (%) | 100 | 16.6 | 16.6 | 35 | 16.6 | 16.6 |
| Absorption by Thread (%) | 3.55 | 2.09 | 2.31 | 3.90 | 3.45 | 2.56 |
| Thread Tension In Grams | 185–195 | 190–195 | 170–180 | 160–180 | 240–260 | 200–220 |

+ Trimethylsiloxy end-blocked dimethylpolysiloxane having a viscosity of 20,000 cP at 25° C.
++ Refined paraffin having a melting range of from 54 to 56° C. (oil content: 0.5 percent, color: pure white, odor: none; cf. "Ullmanns Encyclopadie der technischen Chemie", Volume 18, Munich-Berlin-Vienna, 1967, page 274).
+++ Comparison example (German Patent Application No. 2,162,417, Example 7)
$^4$An aqueous emulsion containing 6 percent by weight based on the weight of (I) + (II), of a nonionic emulsifier, obtained from a nonylphenol and ethylene oxide in a molar ratios of 1:10.
All parts and % are by weight unless otherwise specified.

What is claimed is:
1. A polymeric organosilicon compound of the formula

$$M_aR_bSi\{[(OSiR_2)_nD]_m(OSiR_2)_nOSiR_{3-d}M_d\}_{4-a-b}$$

wherein R is selected from the group consisting of hydrocarbon radicals and substituted hydrocarbon radicals having from 1 to 10 carbon atoms, D is a radical of the formula a is 0 or 1, b is 0, 1 or 2, c is 0 or a number of from 1 to 5, d is 0 or 1, m is 0 or a number of from 1 to 20, n is a number of from 1 to 1,000 with the proviso that at least one X$_a$—A—X$_a$—A radical is present per molecule in which a is 1.

2. The compound of claim 1, wherein the radical M is derived from the group consisting of monovalent phenols, piolyvalent phenols, bis-phenols and mixtures thereof.

* * * * *